US009883328B2

(12) United States Patent
Nagata

(10) Patent No.: US 9,883,328 B2
(45) Date of Patent: Jan. 30, 2018

(54) INFORMATION PROCESSING APPARATUS, INFORMATION PROCESSING METHOD, AND RECORDING MEDIUM

(71) Applicant: Tadashi Nagata, Kanagawa (JP)

(72) Inventor: Tadashi Nagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/118,933

(22) PCT Filed: Feb. 23, 2015

(86) PCT No.: PCT/JP2015/056014
§ 371 (c)(1),
(2) Date: Aug. 15, 2016

(87) PCT Pub. No.: WO2015/129905
PCT Pub. Date: Sep. 3, 2015

(65) Prior Publication Data
US 2016/0360346 A1    Dec. 8, 2016

(30) Foreign Application Priority Data

Feb. 27, 2014 (JP) .................................. 2014-036648
Nov. 12, 2014 (JP) .................................. 2014-229932

(51) Int. Cl.
*H04B 5/00* (2006.01)
*H04W 4/00* (2009.01)
(Continued)

(52) U.S. Cl.
CPC ............ *H04W 4/008* (2013.01); *G06F 9/445* (2013.01); *G06F 9/5027* (2013.01); *H04L 67/1072* (2013.01); *H04W 76/023* (2013.01)

(58) Field of Classification Search
CPC ............ G06K 7/10237; H04M 1/7253; H04M 2250/04; H04W 4/008
(Continued)

(56) References Cited

U.S. PATENT DOCUMENTS 8,219,071 B2 * 7/2012 Kokubo ............ H04M 1/72522
370/256
8,573,485 B2   11/2013 Yoneda et al.
(Continued)

FOREIGN PATENT DOCUMENTS

EP       2432277       3/2012
JP       2005-182128   7/2005
(Continued)

OTHER PUBLICATIONS

International Search Report dated May 19, 2015 in PCT/JP2015/056014 filed on Feb. 23, 2015.
(Continued)

*Primary Examiner* — Eugene Yun
(74) *Attorney, Agent, or Firm* — Ipusa, PLLC

(57) ABSTRACT

An information processing apparatus includes a data format determination unit determining whether data read by near field wireless communications correspond to data read in a peer-to-peer mode; a data attribute determination unit identifying an application that can use the data based on attribute information of the data when it is determined that the data correspond to the data that are read in the peer-to-peer mode; a communication method determination unit identifying an application that can use the data based on a communication method used when the data are read, when it is determined that the data do not correspond to the data that are read in the peer-to-peer mode; and an application use processing unit performing processing so that the application identified by the data attribute determination unit or the application
(Continued)

identified by the communication method determination unit can use the data.

9 Claims, 7 Drawing Sheets

(51) Int. Cl.
  *G06F 9/445* (2006.01)
  *H04L 29/08* (2006.01)
  *H04W 76/02* (2009.01)
  *G06F 9/50* (2006.01)

(58) Field of Classification Search
  USPC .................................................. 455/41.1
  See application file for complete search history.

(56) References Cited

U.S. PATENT DOCUMENTS

| | | |
|---|---|---|
| 2012/0034868 A1 | 2/2012 | Fine et al. |
| 2012/0069772 A1 | 3/2012 | Byrne et al. |
| 2013/0116006 A1 | 5/2013 | Byrne et al. |

FOREIGN PATENT DOCUMENTS

| | | |
|---|---|---|
| JP | 2007-279966 | 10/2007 |
| JP | 2011-243017 | 12/2011 |
| JP | 2012-523727 | 10/2012 |

OTHER PUBLICATIONS

Masashi Murosaki and Tomo Morita, "Feature Articles, Section 3: Kumikomi Platform de Android+NFC no Application wo kaihatsu suru houhou", Interface, Apr. 1, 2012, vol. 38, No. 4, pp. 45-47, ISSN 0387-9569.

The Extended European search report for 15755582.2 dated Jan. 23, 2017.

Anonymous: "NFC Basics | Android Developers", Feb. 19, 2014 (Feb. 19, 2014), XP055332687, Retrieved from the Internet: URL:http://web.archive.org/web/20140219150611/http://developer.android.com/guide/topics/connectivity/nfc/nfc.html [retrieved on Jan. 5, 2017].

Anonymous: "Advanced NFC | Android Developers", Feb. 18, 2014 (Feb. 18, 2014), XP055332685, Retrieved from the Internet: URL:http://web.archive.org/web/20140218100423/http://developer.android.com/guide/topics/connectivity/nfc/advanced-nfc.html [retrieved on Jan. 5, 2017].

Vedat Coskun: "Near Field Communication (NFC): From Theory to Practice—Chapter 3"In: "Near Field Communication (NFC): From Theory to Practice—Chapter 3", Feb. 28, 2012 (Feb. 28, 2012), Wiley, XP055332534, ISBN: 978-1-119-97109-2.

\* cited by examiner

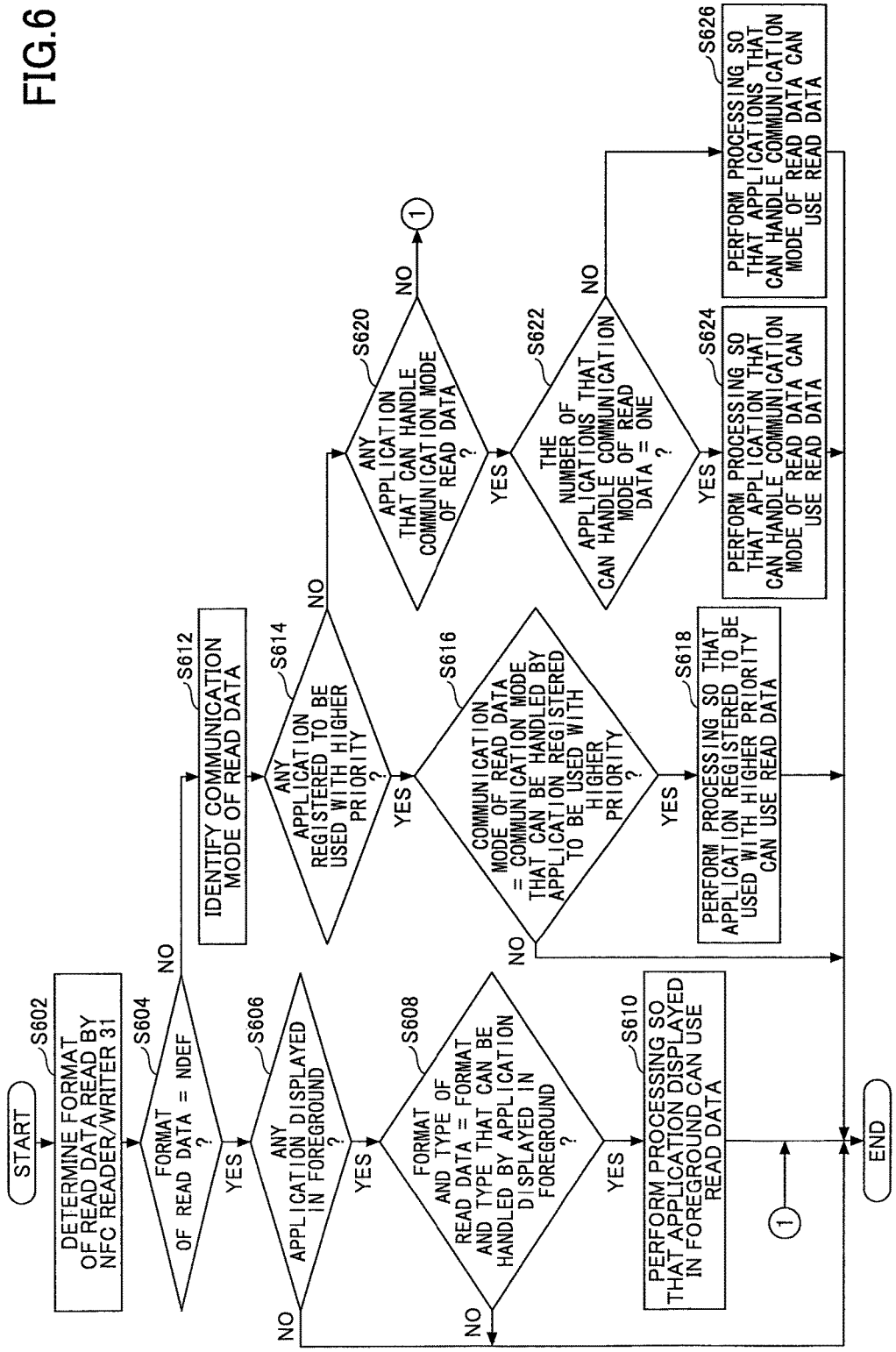

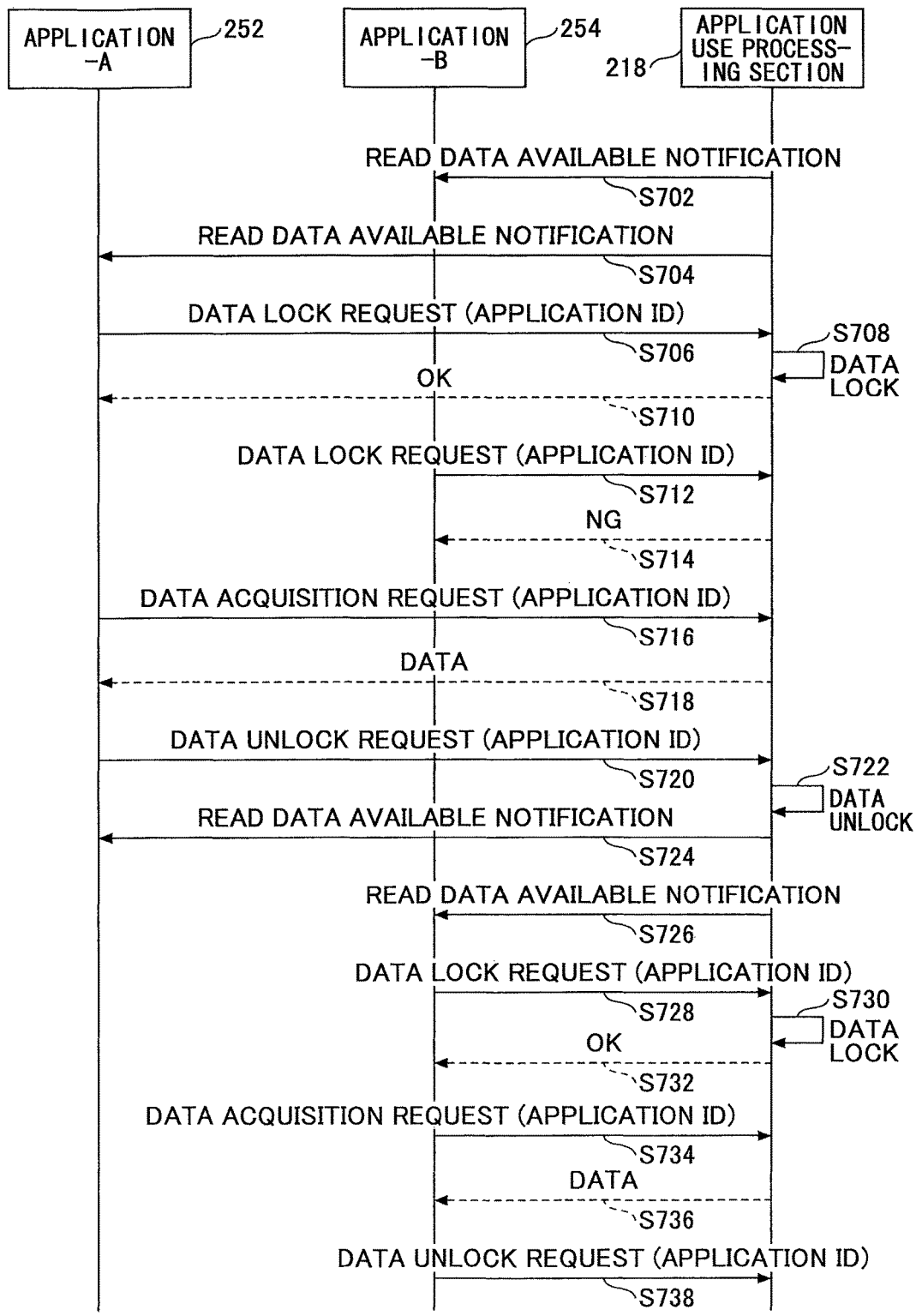

INFORMATION PROCESSING APPARATUS, INFORMATION PROCESSING METHOD, AND RECORDING MEDIUM

TECHNICAL FIELD

The present invention relates to an information processing apparatus.

BACKGROUND ART

Near Field Communication (NFC) is a wireless communication method in which two-way communications are performed within a small range of approximately 10 cm by using an electromagnetic wave of 13.56 MHz. As an international standard of an air interface and a protocol of the NFC, Near Field Communication-Interface and Protocol-1 (NFCIP-1) (ISO/IEC 18092) has been established (standardized), and after that, NFCIP-2, including other cards (ISO/IEC14443A/B, ISO/IEC 15693, ISO/IEC 18000-3), has been established.

The NFC includes plural operation modes. Among the plural operation modes of the NFC, there is a reader/writer mode, in which, by approaching a device, such as an NFC card, and a reading/writing device, such as a card reader/writer, each other, it becomes possible for the reading/writing device to read information of the device. Further, there is a peer-to-peer mode, in which peer-to-peer communications can be performed between devices having NFC built-in.

Regarding the NFC, there is a known technique in which the Near Field Communications are performed between an NFC device and an NFC reader/writer, so that the NFC reader/writer performs an authentication process based on authentication information acquired from the NFC device (see, for example, Patent Document 1).

SUMMARY OF THE INVENTION

Problems to be Solved by the Invention

It is thought that, among the plural operation modes of the NFC, the reader/writer mode and the peer-to-peer mode can exist together in an information processing apparatus.

In a device such as an NFC card, there is provided not only an area where identification information of the NFC card is stored but also a general-purpose area where other information such as billing information can be stored. In the reader/writer mode, it is possible to read information from the general-purpose area of the device such as the NFC card. However, the number of the applications that use the information read from the general-purpose area is not always one. In other words, there may be a case where the information, which is read from the device such as the NFC card, is used by plural applications. In this regard, it is desired to set (provide) an application that performs a process on the information read from the device such as the NFC card.

On the other hand, in the peer-to-peer mode, it often happens that the number of the applications that uses the information read from the general-purpose area of the device having the NFC built-in is one.

Therefore, an object of the present invention is to make it possible for an information processing apparatus to operate in both NFC operation modes (i.e., the reader/writer mode and the peer-to-peer mode).

Means for Solving the Problems

According to an aspect of the present invention, an information processing apparatus includes a data format determination unit determining whether data, which are read by near field wireless communications, correspond to data that are read in a peer-to-peer mode in the near field wireless communications; a data attribute determination unit identifying an application that can use the data based on attribute information of the data, in a case where it is determined that the data correspond to the data that are read in the peer-to-peer mode by the data format determination unit; a communication method determination unit identifying an application that can use the data based on a communication method used when the data are read, in a case where it is determined that the data do not correspond to the data that are read in the peer-to-peer mode by the data format determination unit; and an application use processing unit performing processing so that the application identified by the data attribute determination unit or the application identified by the communication method determination unit can use the data.

Effects of the Present Invention

According to an aspect of the present invention, it becomes possible for an information processing apparatus to operate NFC operation modes which are the reader/writer mode and the peer-to-peer mode.

BRIEF DESCRIPTION OF THE DRAWINGS

FIG. 6 is a flowchart of an example operation of the composite apparatus according to an embodiment of the present invention; and FIG. 7 is a sequence diagram illustrating an example operation of the composite apparatus according to an embodiment of the present invention.

BEST MODE FOR CARRYING OUT THE INVENTION

Figure 1:
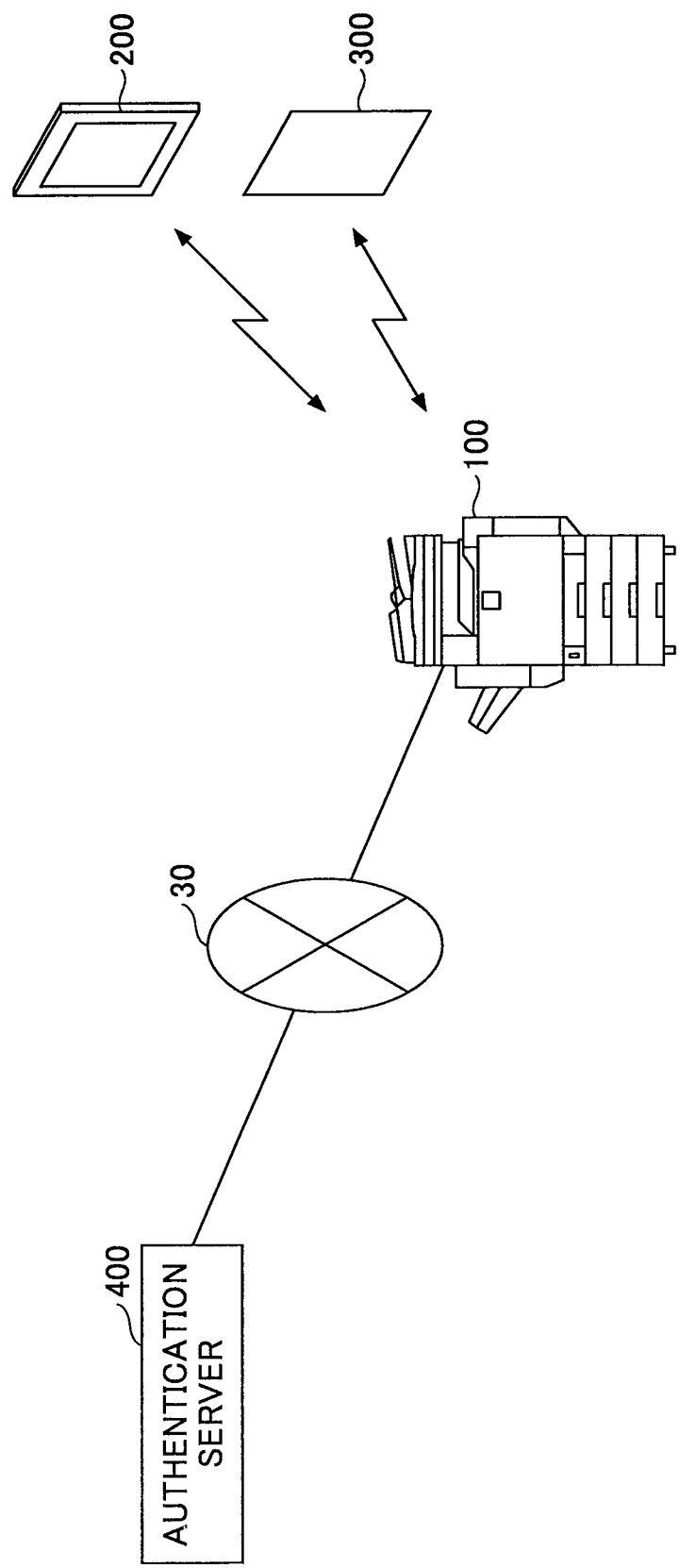
FIG. 1 is a drawing illustrating an information processing system according to an embodiment of the present invention.

Next, an embodiment of the present invention is described with reference to the accompanying drawings. Note that the embodiment described below is an example only. Namely, the embodiments to which the present invention can be applied are not limited to the embodiment described below.

Further, throughout the drawing which areas referred to describe the embodiment, the same reference numerals are used to describe the elements having the same functions and the repeated descriptions thereof may be herein omitted.

Embodiment

Information Processing System

FIG. 1 illustrates an information processing apparatus according to an embodiment.

The information processing apparatus includes a composite apparatus 100, an information terminal 200, and an integrated circuit (IC) card 300. As an example of the composite apparatus 100, there are a printer, a scanner, a copier, a facsimile machine, and a MultiFunction Peripheral (MFP) having those functions. Further, the composite apparatus 100 may be an apparatus including a projector, which not only has a printing function but also an image forming function like projecting and displaying, an electronic whiteboard apparatus, etc.

The composite apparatus 100 is mutually connected with an authentication server 400 via a network. The network is not limited to a specific network, and may be, for example, an Ethernet (registered trademark), a Local Area Network (LAN) or a Virtual Private Network (VPN) based on a transaction protocol such as a Transmission Protocol/Internet protocol (TCP/IP), a Wide Area Network (WAN) or the like.

The information terminal 200 supports the NFC, and performs the Near Field Communication (NFC) with the composite apparatus 100. However, as long as a device supports the NFC, the device, such as a personal computer (PC) a tablet terminal, a smartphone, etc., may be used in place of the information terminal 200.

The IC card 300 supports the NFC, and performs the Near Field Communication (NFC) with the composite apparatus 100. Further, the IC card 300 has an IC chip built-in, so that information can be stored in the IC chip. However, as long as a device supports the NFC, the device, such as an IC tag, etc., may be used in place of the IC card 300.

The composite apparatus 100 performs the Near Field Communication (NFC) with the information terminal 200. By doing this, the composite apparatus 100 receives data (e.g., image information) transmitted by the information terminal 200, so that application software can use the data.

Further, by performing the Near Field Communication (NFC) with the IC card 300, the composite apparatus 100 receives data, such as identification information of the IC card 300, transmitted by the IC card 300, so that application software can use the data. Specifically, by holding the IC card 300 over the composite apparatus 100, the composite apparatus 100 can read the identification information stored in the IC card 300. By transmitting the identification information of the IC card 300 to the authentication server 400, the composite apparatus 100 requests the authentication server 400 to perform authentication. Based on the identification information transmitted from the composite apparatus 100, the authentication server 400 authenticates the user who carries (holds) the IC card 300. The authentication server 400 can perform the authentication by determining whether the identification information is included in card ID information having been registered. The authentication server 400 reports the result of the determination whether the authentication has been successful or has failed to the composite apparatus 100. However, by having the function similar to that of the authentication server 400, the composite apparatus 100 may authenticate the user who carries the IC card 300 without using the authentication server 400.

Hardware Configuration of the Composite Apparatus 100

Figure 2:
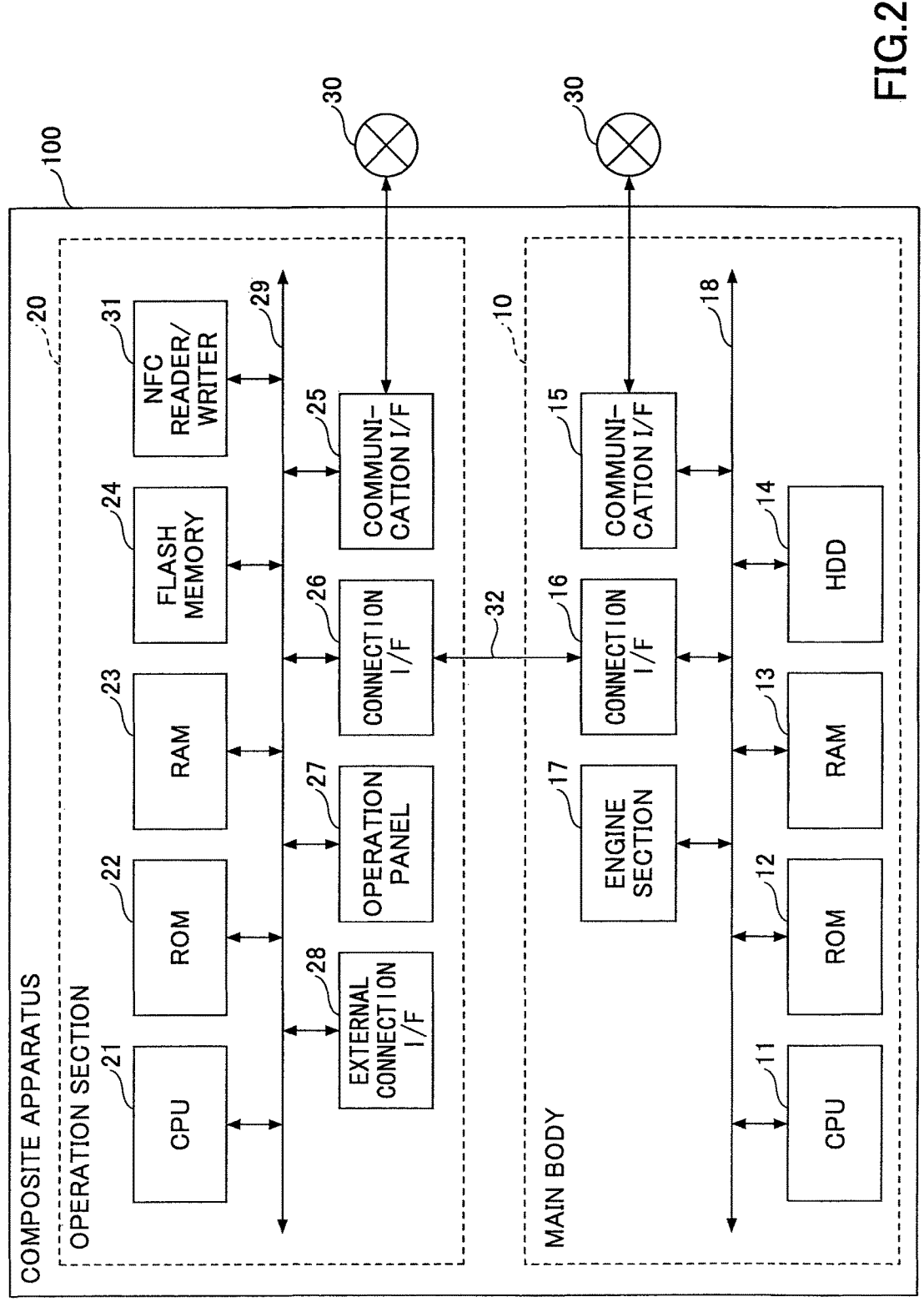
FIG. 2 is a drawing illustrating a hardware configuration of a composite apparatus according to an embodiment of the present invention.

FIG. 2 illustrates a hardware configuration of the composite apparatus 100. The composite apparatus 100 includes a main body 10, which can realize various functions such as a copy function, a scanner function, a facsimile function, a printer function, etc., and an operation section 20 which receives a user's operation. Here, the term "receives a user's operation" conceptually includes a receipt of information (including, for example, a signal indicating coordinate value of an image) that is input in accordance with the user's operation. The main body 10 and the operation section 20 are mutually connected to each other via a dedicated communication path (line) 32. As the communication path 32, for example, a communication path compliant with Universal Serial Bus (USB) standard may be used. Further, as the communication path 32, a wireless or wired communication path, which is compliant with any other standard, may also be used.

Here, the main body 10 can function in accordance with an operation received by the operation section 20. Further, the main body 10 can communicate with an external device such as a client PC, so as to function in accordance with an instruction received from the external device.

First, a hardware configuration of the main body 10 is described. As illustrated in FIG. 2, the main body 10 includes a Central Processing Unit (CPU) 11, a Read-Only Memory (ROM) 12, a Random Access Memory (RAM) 13, a Hard Disk Drive (HDD) 14, a communication interface (I/F) 15, a connection I/F 16, and an engine section 17, which are connected to each other via a system bus 18.

The CPU 11 controls overall operation of the main body 10. The CPU 11 controls overall operation of the main body 10 by executing a program stored in the ROM 12, the HDD 14 or the like by using the RAM 13 as a work area. By doing this, it becomes possible to realize the various functions described above, such as the copy function, the scanner function, the facsimile function, the printer function, etc.

The communication I/F 15 is an interface to connect with a network 30. The connection I/F 16 is an interface to connect with the operation section 20 via the communication path 32.

The engine section 17 is a hardware that performs processes other than general-purpose information processing and communications, so as to realize the copy function, the scanner function, the facsimile function, and the printer function. To that end, the engine section 17 includes, for example, a scanner to scan and read a draft image (image reading section), a plotter to print (image) data on a sheet material such as a sheet (image forming section), and a facsimile section to perform fax transmission. The engine section 17 may further include specific options such as a finisher, which divides printed sheets, an Automatic Draft Feeder (ADF), which automatically feeds a draft, etc.

Next, a hardware configuration of the operation section 20 is described. As illustrated in FIG. 2, the operation section 20 includes a CPU 21, a ROM 22, a RAM 23, a flash memory 24, a communication I/F 25, a connection I/F 26, an operation panel 27, an external connection I/F 28, and an NFC reader/writer 31, which are connected to each other via a system bus 29.

The CPU 21 controls overall operation of the operation section 20. The CPU 21 controls overall operation of the operation section 20 by executing a program stored in the ROM 22, the flash memory 24 or the like by using the RAM 23 as a work area. By doing this, it becomes possible to control the overall operation of the operation section 20 and realize various functions, such as displaying information (an image), in accordance with input received from a user.

The communication I/F 25 is an interface to connect with the network 30. The connection I/F 26 is an interface to connect with the main body 10 via the communication path 32.

The operation panel 27 receives various inputs in accordance with user's operations, and displays various information (e.g., information in response to a received operation, information indicating an operation state of the composite apparatus 100, information indicating a setting state, etc.). In this embodiment, a case is described where the operation panel 27 is made of a Liquid Crystal Display (LCD) having a touch panel function therein. However, the operation panel 27 is not limited to this configuration. The operation panel 27 may be made of an organic Electro Luminescence (EL) having a touch panel function therein. Further, in addition to or in place of the above configuration, an operation section including hardware keys and/or a display section using lamps may be provided.

The external connection I/F 28 is an interface to be connected with an external device such as an IC card reader.

The NFC reader/writer 31 performs the Near Field Communication (NFC) with the information terminal 200 and the IC card 300 by using an electromagnetic wave of 13.56 MHz.

Software Configuration of the Composite Apparatus 100

Figure 3:
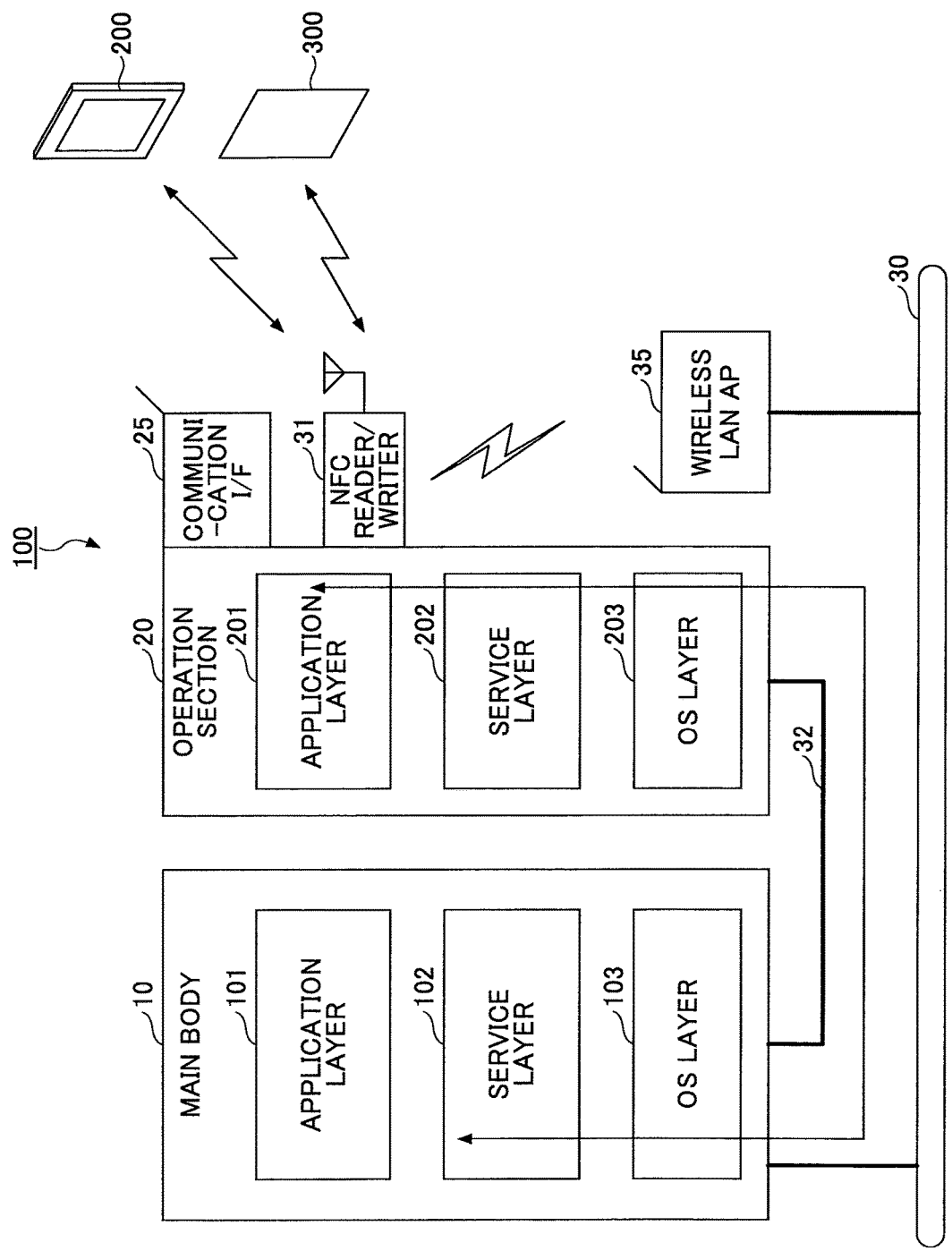
FIG. 3 is a drawing illustrating a software configuration of the composite apparatus according to an embodiment of the present invention.

FIG. 3 illustrates an example software configuration of the composite apparatus 100.

As illustrated in FIG. 3, the main body 10 includes an application layer 101, a service layer 102, and an Operating System (OS) layer 103. The entities of the application layer 101, the service layer 102, and the OS layer 103 are various software (programs) stored in the ROM 12, the HDD 14, etc. By executing the various software by the CPU 11, various functions can be provided.

The software of the application layer 101 is an application software (hereinafter may be simplified as an "application") that is for providing predetermined functions by operating hardware resources. The application includes a copy application which provides the copy function, a scanner application which provides the scanner function, a facsimile application which provides the facsimile function, a printer application which provides the printer function, etc. The application further includes an application that uses the data transmitted by the information terminal 200 or the IC card 300 and read by the NFC reader/writer 31. Specifically, the application further includes an application which uses the data, such as the image information, transmitted by the information terminal 200, and an authentication application and a billing process application which use the identification information and the billing information, respectively, transmitted by the IC card 300.

The software of the service layer 102 stands between the application layer 101 and the OS layer 103, and is the software for providing an interface to the applications of the application layer 101 to use the hardware resources of the main body 10. More specifically, the software of the service layer 102 is the software that receives operation requests to the hardware resources and provides functions to perform adjustments on the operation requests. As the operation requests that the service layer 102 receives, there are, for example, a request to read by a scanner, a request to print by a plotter, etc.

Further, the interface function by the service layer 102 is provided to not only the application layer 101 of the main body 10 but also an application layer 201 of the operation section 20. Namely, the application layer 201 (application) of the operation section 20 also can realize the function which uses the hardware resources (e.g., the engine section 17) of the main body 10 via the interface function of the service layer 102.

The software of the OS layer 103 is a fundamental software (operating system) for providing fundamental functions to control the hardware of the main body 10. The software of the service layer 102 converts the requests to use the hardware resources from various applications into the commands that can be interpreted by the OS layer 103, and transmits the commands to the OS layer 103. Then, by executing the commands by the software of the OS layer 103, it becomes possible for the hardware resources to perform the operations in accordance with the requests from the applications.

Similarly, the operation section 20 includes an application layer 201, a service layer 202, and an OS layer 203. A hierarchy structure of the application layer 201, the service layer 202, and the OS layer 203 is similar to that of the main body 10. However, the functions that are provided by the application of the application layer 201 and types of the operation requests that can be received by the service layer 202 differ from those of the main body 10. The application of the application layer 201 may be a software that provides predetermined functions by operating the hardware resources of the operation section 20. However, basically, the application of the application layer 201 is a software that provides a function of a user interface (UI) for operating and displaying the functions (i.e., the copy function, the scanner function, the facsimile function, the printer function) that the main body 10 mainly has.

In this embodiment, in order to keep independence, the software of the OS layer 103 of the main body 10 and the software of the OS layer 203 of the operation section 20 are different from each other. Namely, the main body 10 and the operation section 20 operate independently using the respective operating systems different from each other. For example, Linux (registered trademark) may be used as the software of the OS layer 103 of the main body 10 and Android (registered trademark) may be used as the software of the OS layer 203 of the operation section 20.

As described above, in the composite apparatus 100 in this embodiment, the main body 10 and the operation section 20 operate using the respective operating systems different from each other. Therefore, the communications between the main body 10 and the operation section 20 are performed not as the process-to-process communications within a common device (apparatus) but as the communications between difference devices (apparatuses). The operation that the operation section 20 transmits the received information (content of user's instructions) to the main body 10 (command communication) and the operation that the main body 10 notifies the operation section 20 of an event correspond to the communications between different devices (apparatuses). Here, the operation section 20 can use the functions of the main body 10 by performing the command communication to the main body 10. On the other hand, as an example of the event that main body 10 notifies the operation section 20, there are, for example, an execution state of the operations in the main body 10 and the content that is set in the main body 10.

Further, in this embodiment, power to the operation section 20 is supplied from the main body 10 via the communication path 32. Therefore, the power control of the operation section 20 can be performed separately from (independently of) the power control of the main body 10.

Functional Configuration of the Composite Apparatus 100

Figure 4:
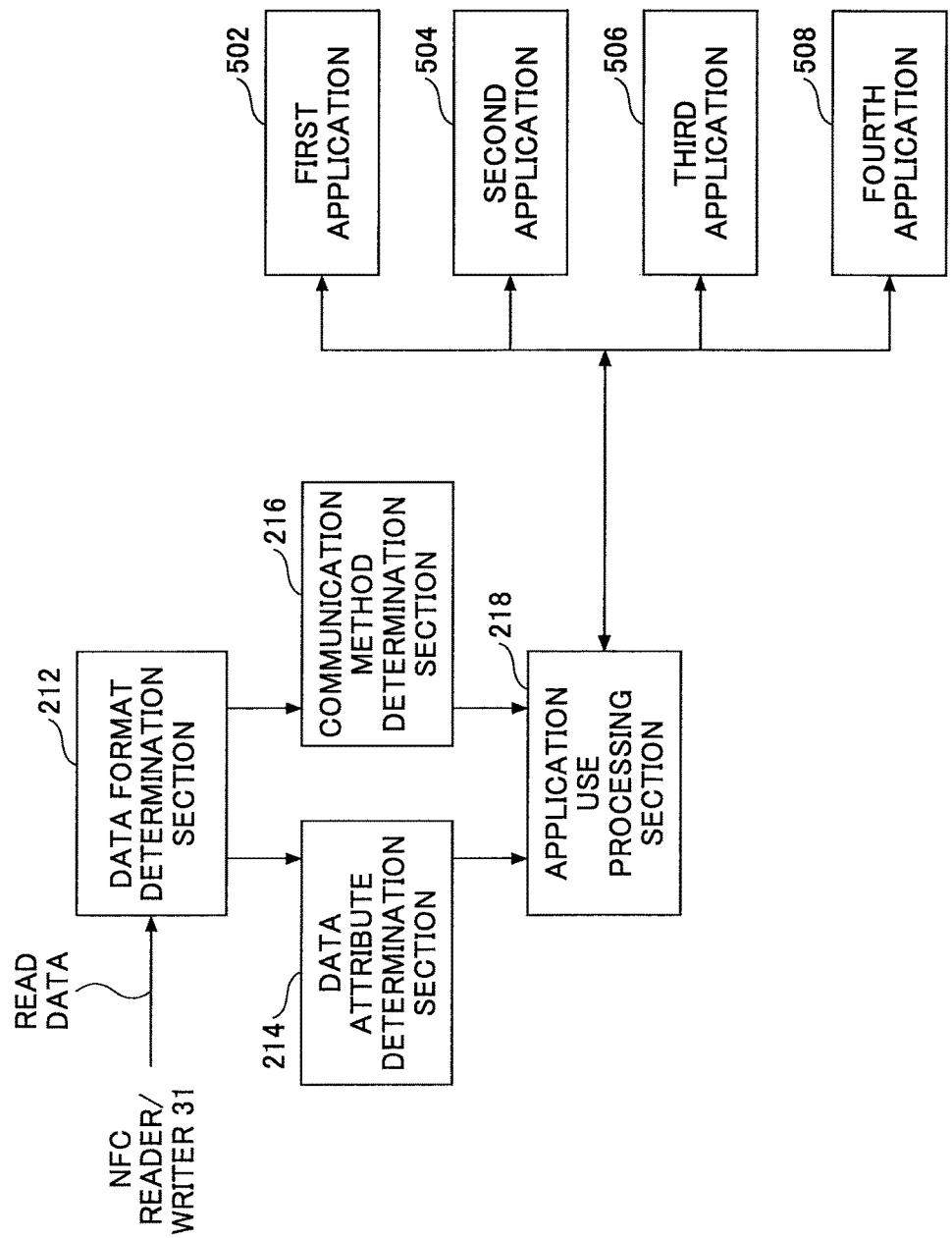
FIG. 4 is a functional block diagram of the composite apparatus according to an embodiment of the present invention.

Next, a functional configuration of the composite apparatus 100 is described. FIG. 4 is a functional block diagram of an example functional configuration of the composite apparatus 100. For explanatory purposes, FIG. 4 illustrates only main functions related to the present invention. Namely, the functions of the composite apparatus 100 are not limited to the functions described in FIG. 4.

The composite apparatus 100 includes a data format determination section 212 and a data attribute determination section 214, a communication method determination section 216, and an application use processing section 218.

The data format determination section 212 determines the format of the data that are read by the NFC reader/writer 31 (hereinafter referred to as "read data"). The data read by the NFC reader/writer 31 are the data stored in the information terminal 200 and the data stored in the IC card 300. Specifically, the data format determination section 212 determines whether the format of the read data is the format called "NFC Data Exchange Format" (NDEF). By doing this, it becomes possible to determine whether the read data correspond to the data that are transmitted from the information terminal 200 to the NFC reader/writer 31 using the peer-to-peer mode.

Figure 5:
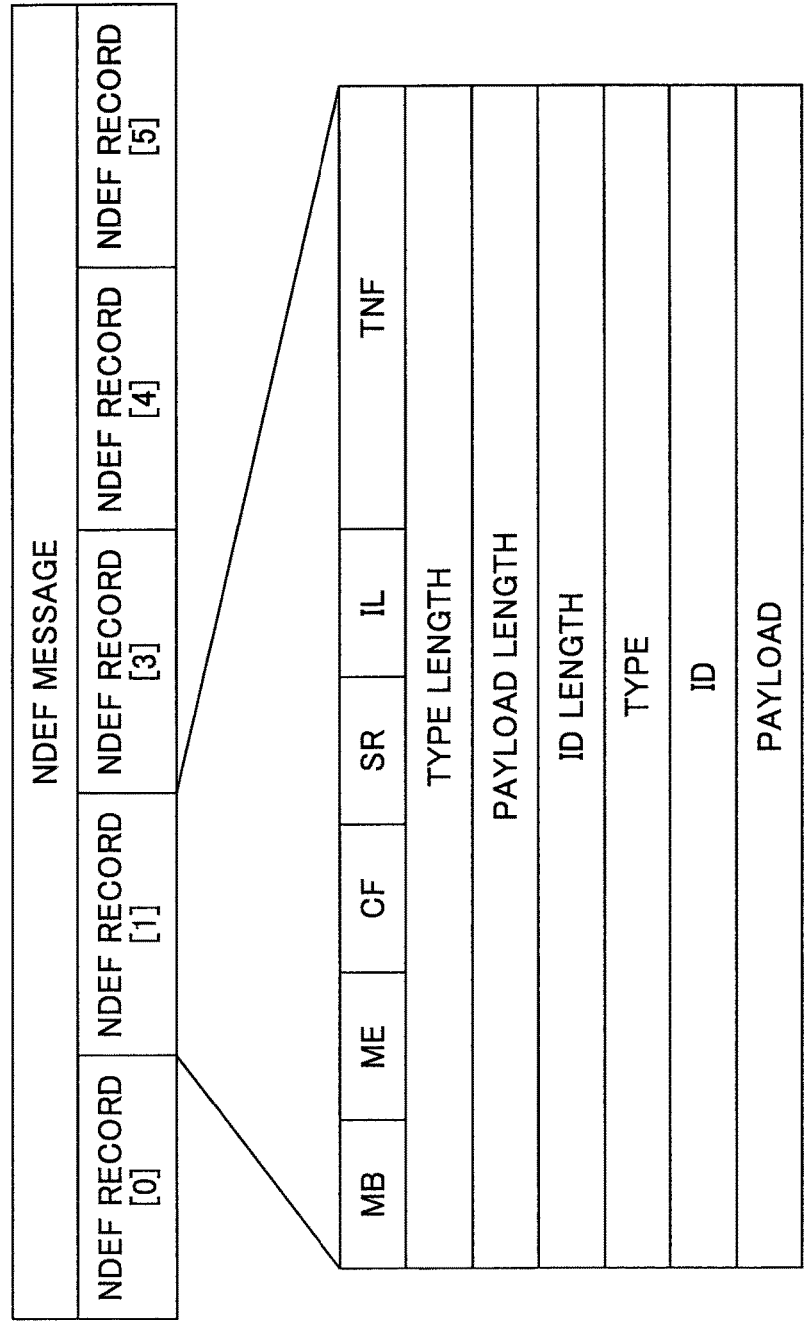
FIG. 5 is a drawing illustrating an example of a data structure of NDEF.

FIG. 5 illustrates an example data structure of the NDEF.

An NDEF message having the data structure of the NDEF includes a plurality of NDEF records. In the example of FIG. 5, the NDEF message includes NDEF RECORD [0] through NDEF RECORD [5]. Note that the NDEF message may include one through five NDEF RECORDs or seven or more NDEF RECORDs.

Each NDEF record includes five flags called "Message Begin (MB)", "Message End (ME)", "Chunked Flag (CF)", "Short Record (SR)", and "ID Length (IL)". The flag "MB" indicates whether the NDEF record corresponds to the first NDEF record of the NDEF message. The flag "ME" indicates whether the NDEF record corresponds to the last NDEF record of the NDEF message. The flag "CF" indicates whether the NDEF record corresponds to a divided record. The flag "SR" indicates whether the payload (data main body) is less than or equal to 255 Bytes. The flag "IL" indicates whether there exist "ID LENGTH" and "ID" described below.

Each NDEF record includes seven fields called "TNF", "TYPE LENGTH", "PAYLOAD LENGTH", "ID LENGTH", "TYPE", "ID", and "PAYLOAD". The field "TNF" indicates a type of data to be attached to the fields "TYPE", "ID", and "PAYLOAD". The fields "TYPE LENGTH", "PAYLOAD LENGTH", and "ID LENGTH" indicate the lengths of data to be attached to the "TYPE", "PAYLOAD", and "ID", respectively. The field "TYPE" indicates a type of the payload, and the field "ID" denotes the identification information to identify the payload.

In an example of the NDEF message, "MIME_TYPE" is stored in the NDEF RECORD [0], and the data main body is stored in the NDEF RECORD [1] and the NDEF RECORDs after the NDEF RECORD [1]. Specifically, "TNF_MIME_MEDIA" is attached to the "TNF" of the NDEF RECORD [0], "TEXT" is attached to the "TYPE" of the NDEF RECORD [0], and "MFP_DATA" is stored in the "PAYLOAD" of the NDEF RECORD [0]. By attaching the "TNF_MIME_MEDIA" to the "TNF", the type of the data is designated. Further, "UNKNOWN" is attached to the "TNF" of the NDEF RECORD [1] and the NDEF RECORD [2], and "TEXT" is attached to the "TYPE" of the NDEF RECORD [1] and the NDEF RECORD [2]. Further, "a part of the data main body" is stored in the "PAYLOAD" of the NDEF RECORD [1] and the NDEF RECORD [2].

Referring back to FIG. 4, the descriptions continue. The data format determination section 212 can determine whether the format of the read data corresponds to the NDEF by determining whether the format of the read data correspond to the format of the NDEF message illustrated in FIG. 5. Further, when determining that the format of the read data corresponds to the NDEF, the data format determination section 212 notifies the data attribute determination section 214 of the information that the format of the read data corresponds to the NDEF. On the other hand, when determining that the format of the read data dose not correspond to the NDEF, the data format determination section 212 notifies the communication method determination section 216 of the information that the format of the read data does not correspond to the NDEF.

The data attribute determination section 214 determines whether there exists an application that handles the data corresponding to data attributes of the read data based on the data attributes of the read data. The data attribute determination section 214 can refer to definition files of the applications of the application layer 101. The definition file may be called "manifest".

The definition file includes essential attribute information related to the application. By transmitting the information included in the definition file to the CPU 11 or the CPU 21, it becomes possible for the CPU 11 or the CPU 21, respectively, to execute the application. In the attribute information, the information indicating the data format that can be handled and the data type such as text data, the information indicating the communication method, and the information indicating that the application is, in foreground display when the application is displayed in foreground are described. By being displayed in foreground, it is known that the application displayed in the foreground is in an active state. The data attribute determination section 214 refers to the definitions files of the applications, so that the data attribute determination section 214 identifies the formats and the types of the data that can be handled by the applications and acquires the information indicating whether the applications are displayed in foreground.

Upon being notified that the data format of the read data corresponds to the NDEF by the data format determination section 212, the data attribute determination section 214 acquires the information indicating the type of the data attached to the "PAYLOAD" of the read data. The data attribute determination section 214 determines whether the format and the type of the read data correspond to the format and the type of the data that can be handled by the application which is displayed in foreground. When determining that the format and the type of the read data correspond to the format and the type of the data that can be handled by the application which is displayed in foreground, the data attribute determination section 214 notifies the application use processing section 218 of the information that the format and the type of the read data correspond to the format and the type of the data that can be handled by the application which is displayed in foreground. Here, the peer-to-peer communication is a one-to-one communication. Therefore, even when there are two or more applications that can handle the read data, it is not possible to determine the application that uses the read data. Therefore, it is determined whether the read data transmitted in the peer-to-peer mode can be used based on the determination whether the format and the type of the read data correspond to the format and the type of the data that can be handled by the application which is displayed in foreground.

Upon being notified that the format of the read data dose not correspond to the NDEF by the data format determination section 212, the communication method determination section 216 determines the communication method of the read data. Namely, the communication method determination section 216 determines the communication method of the IC card 300 that transmits the read data in the reader/writer mode. Specifically, the communication method determination section 216 determines whether the communication method of the read data corresponds to any one of ISO/IEC 14443 Type A, ISO/IEC 14443 Type B, Felica (registered trademark), etc. The communication method determination section 216 determines whether the communication method of the read data corresponds to a communication method that can be handled by the application. When determining that the communication method of the read data corresponds to a communication method that can be handled by the application, the communication method determination section 216 notifies the application use processing section 218 of the information that the communication method of the read data corresponds to a communication method that can be handled by the application.

The application use processing section 218 perform processing so that the read data can be used by the application. The application use processing section 218 can be realized by a dispatcher, and notifies the application, which can use the read data, of the read data. The application, that is notified that the read data can be used, can acquire and process the notified application.

More detail is described. In FIG. 4, a first application 502, a second application 504, a third application 506, and a fourth application 508 are installed in the composite apparatus 100 as a candidate application that uses the read data. The first application 502 and the second application 504 operate in the peer-to-peer mode. The third application 506 and the fourth application 508 operate in the reader/writer mode. Here, it is assumed that the first application 502 is displayed in foreground. Further, it is assumed that the third application 506 is an authentication application, the fourth application 508 is a billing application, and a higher priority is placed on the process of the third application 506 than that of the fourth application 508. Note that the number of the applications in FIG. 4 is an example only. Namely, it is possible to install one through three applications and five or more applications in the composite apparatus 100. Further, an application other than any of the above applications may be installed.

Upon being notified that the format and the type of the read data correspond to the format and the type of the data that can be handled by the first application 502, displayed in foreground, by the data attribute determination section 214, the application use processing section 218 notifies the first application 502, displayed in foreground, of the information that the read data can be used, and performs a process so that the read data can be used by the first application 502. By doing this, it becomes possible for the first application 502 displayed in foreground to acquire and perform processing on the read data.

Further, upon being notified that the communication method of the read data corresponds to the communication method that can be handled by the application by the communication method determination section 216, the application use processing section 218 notifies the application of the information that the read data can be used, in a case where a higher priority is placed on the application. In this case, upon being notified that the communication method of the read data corresponds to the communication method that can be handled by the third application 506, the application use processing section 218 notifies the third application 506 of the information that the read data can be used. By doing this, the third application 506, which is notified that the read data can be used, can acquire and perform processing on the read data.

A priority order can be registered relative to the processes of the applications, so that it becomes possible to execute a process to be performed first such as the authentication process and then execute another process such as the billing process.

The functions of the elements of the composite apparatus 100 (i.e., the data format determination section 212, the data attribute determination section 214, the communication method determination section 216, and the application use processing section 218) can be realized by executing a program, stored in a storage device such as the ROM 12, the HDD 14, the ROM 22, the flash memory 24, etc., by the CPU 11 or the CPU 21. However, the present invention is not limited to this configuration. For example, a part of the functions of the elements of the composite apparatus 100 may be realized by a dedicated hardware circuit (e.g., a semiconductor integrated circuit, etc.)

Further, in the embodiment described above, a case is described where the main body 10 and the operation section 20 operate independently from each other by using different operating systems from each other. However, the present invention is not limited to this configuration. For example, the main body 10 and the operation section 20 may operate using the same operating system.

Further, the program, which is to be executed by the composite apparatus 100 according to this embodiment, may be provided in an installable and executable format and in a computer-readable recording medium such as a Compact Disc ROM (CD-ROM), a Flexible Disk (FD), a CD-recordable (CD-R), a Digital Versatile Disk (DVD), a Universal Serial Bus (USB) memory, etc., or may be provided or distributed via a network such as the Internet, etc. Otherwise, for example, the programs may be installed in a non-volatile recording medium such as a ROM, etc., in advance and provided.

Operation of the Composite Apparatus 100

FIG. 6 is a flowchart of an example operation of the composite apparatus 100.

In step S602, the data format determination section 212 of the composite apparatus 100 determines the format of the read data which is read by the NFC reader/writer 31.

In step S604, the data format determination section 212 of the composite apparatus 100 determines whether the format of the read data is the NDEF.

In step S606, when the format of the read data is the NDEF, the data attribute determination section 214 refers to the definition files and determines whether there exists an application displayed in foreground. When it is determined that there is no application displayed in foreground, the process ends.

In step S608, when determining that there exists an application displayed in foreground, the data attribute determination section 214 acquires the type of the data described in the PAYLOAD of the read data. The data attribute determination section 214 refers to the definition file of the application, and determines whether the format and the type of the read data correspond to the format and the type of the data that can be handled by the application displayed in foreground. When it is determined that the format and the type of the read data do not correspond to the format and the type of the data that can be handled by the application displayed in foreground, the process ends.

In step S610, when it is determined that the format and the type of the read data correspond to the format and the type of the data that can be handled by the application displayed in foreground, the application use processing section 218 performs processing so that the application, displayed in foreground, can use the read data.

In step S612, when the format of the read data is not the NDEF, the communication method determination section 216 identifies the communication method of the read data.

In step S614, the communication method determination section 216 determines whether there exists an application that is registered as the application to be used with a higher priority.

In step S616, when it is determined that there exists an application that is registered as the application to be used with a higher priority, the communication method determination section 216 determines whether the communication method, which can be handled by the application that is registered as the application to be used with a higher priority, corresponds to the communication method of the read data. When it is determined that the communication method, which can be handled by the application that is registered as the application to be used with a higher priority, does not correspond to the communication method of the read data, the process ends.

In step S618, when it is determined that the communication method, which can be handled by the application that is registered as the application to be used with a higher priority, corresponds to the communication method of the read data, the communication method determination section 216 performs processing so that the application, which is registered as the application to be used with a higher priority, can use the read data.

In step S620, when there is no application that is registered as the application to be used with a higher priority, the communication method determination section 216 determines whether there exists an application that can handle the communication method of the read data. When it is determined that there is no application that can handle the communication method of the read data, the process ends.

In step S622, when it is determined that there exists an application that can handle the communication method of the read data, the communication method determination section 216 determines whether the number of the applications that can handle the communication method of the read data is one.

In step S624, when it is determined that the number of the applications that can handle the communication method of the read data is one, the application use processing section 218 performs a process so that the application, which can handle the communication method of the read data, can use the read data.

In step S626, when it is determined that the number of the applications that can handle the communication method of the read data is other than one, the application use processing section 218 performs a process so that the applications, which can handle the communication method of the read data, can use the read data. This process is described below.

FIG. 7 illustrates a flow in which, when it is determined that the number of the applications that can handle the communication method of the read data is other than one in step S626, the application use processing section 218 performs processing so that the applications can use the read data. The application use processing section 218 notifies the applications of the information that the read data can be used. The applications, which are notified that the read data can be used, send respective data lock requests. The application use processing section 218 selects the application that transmits the data lock request first from among the applications to which the information that the read data can be used is notified. By doing this, it becomes possible for the composite apparatus 100 to perform exclusive control when there are plural applications that use the read data.

The example of FIG. 7 illustrates a case where it is determined that there are two applications, Application-A 252 and Application-B 254, that can handle the communication method of the read data. Note that the process of FIG. 7 may also be applied on a case where the number of the applications that can handle the communication method of the read data is three or more in addition to two.

In step S702, the application use processing section 218 transmits a read data available notification, that indicates that the read data can be used, to the Application-B 254. The read data are input by the device driver of the NFC reader/writer 31.

In step S704, the application use processing section 218 transmits the read data available notification to the Application-A 252.

In step S706, the Application-A 252 sends the data lock request to the application use processing section 218. Here, identification information of the application such as an application ID of the Application-A 252, etc., is attached to the data lock request.

In step S708, the application use processing section 218 performs data lock in a manner so that the Application-A 252 can use the read data.

In step S710, the application use processing section 218 notifies the Application-A 252 that it is possible to respond to the data lock request.

In step S712, the Application-B 254 sends the data lock request to the application use processing section 218. Here, the identification information of the application such as the application ID of the Application-B 254, etc., is attached to the data lock request.

In step S714, the application use processing section 218 notifies the Application-B 254 that it is not possible to respond to the data lock request because the data lock has been performed already so that the Application-A 252 can use the read data.

In step S716, the Application-A 252 sends a data acquisition request to the application use processing section 218. Here, the identification information of the application such as the application ID of the Application-A 252, etc., is attached to the data acquisition request.

In step S718, the application use processing section 218 transmits the data, which are requested by the data acquisition request, to the Application-A 252.

In step S720, the Application-A 252 sends a data unlock request to the application use processing section 218. Here, the identification information of the application such as the application ID of the Application-A 252, etc., is attached to the data unlock request.

In step S722, the application use processing section 218 performs the data unlock.

In step S724, the application use processing section 218 transmits the read data available notification to the Application-A 252.

In step S726, the application use processing section 218 transmits the read data available notification, that indicates that the read data can be used, to the Application-B 254.

In step S728, the Application-B 254 sends the data lock request to the application use processing section 218. Here, the identification information of the application such as the application ID of the Application-B 254, etc., is attached to the data lock request.

In step S730, the application use processing section 218 performs the data lock in a manner so that the Application-B 254 can use the read data.

In step S732, the application use processing section 218 notifies the Application-B 254 that it is possible to respond to the data lock request.

In step S734, the Application-B 254 sends the data acquisition request to the application use processing section 218. Here, the identification information of the application such as the application ID of the Application-B 254, etc., is attached to the data acquisition request.

In step S736, the application use processing section 218 transmits the data, which are requested by the data acquisition request, to the Application-B 254.

In step S738, the Application-B 254 sends the data unlock request to the application use processing section 218. Here, the identification information of the application such as the application ID of the Application-B 254, etc., is attached to the data unlock request.

In step S728 of the sequence chart in FIG. 7, if the Application-A 252 sends the data lock request, the Application-A 252 would sequentially acquire the read data. Therefore, it is also possible to notify that it is not possible to respond to the data lock request transmitted from the Application-A 252. By doing this, it becomes possible to prevent an event that an application sequentially performs processing on the read data.

According to an embodiment of the composite apparatus 100, it is determined whether the data that is read by the NFC reader/writer 31 are the data that are read in the peer-to-peer mode. When it is determined that the data that is read by the NFC reader/writer 31 are the data that are read in the peer-to-peer mode, a notification that the read data can be used to the application that can use the read data. On the other hand, when it is determined that the data that is read by the NFC reader/writer 31 are not the data that are read in the peer-to-peer mode, based on a communication method by which the read data are transmitted, a notification that the read data can be used to the application that corresponds to (support) the communication method. By doing this, it becomes possible for the composite apparatus 100 to respond to both NFC operation modes (i.e., the reader/writer mode and the peer-to-peer mode).

Further, by performing the exclusive control so that only the application that responds first can use when the notification that the read data read in the reader/writer mode can be used to plural applications, it becomes possible for the plural applications to use the read data.

The composite apparatus 100 is an example of claimed "information processing apparatus", and the NFC is an example of claimed "near field wireless communications".

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application Nos. 2014-036648 filed Feb. 27, 2014, and 2014-229932 filed Nov. 12, 2014, the entire contents of which are hereby incorporated herein by reference.

DESCRIPTION OF THE REFERENCE NUMERALS

10: MAIN BODY
11, 21: CPU
12, 22: ROM
13, 23: RAM
14: HDD
15, 25: COMMUNICATION I/F
16, 26: CONNECTION I/F
17: ENGINE SECTION
18, 29: SYSTEM BUS
20: OPERATION SECTION
24: FLASH MEMORY
27: OPERATION PANEL
28: EXTERNAL CONNECTION I/F
30: NETWORK
32: COMMUNICATION PATH
100: COMPOSITE APPARATUS
200: INFORMATION TERMINAL
212: DATA FORMAT DETERMINATION SECTION
214: DATA ATTRIBUTE DETERMINATION SECTION
216: COMMUNICATION METHOD DETERMINATION SECTION
218: APPLICATION USE PROCESSING SECTION
300: IC CARD
400: AUTHENTICATION SERVER

PRIOR ART DOCUMENTS

Patent Document

[Patent Document 1] Japanese Laid-open Patent Publication No. 2011-243017

The invention claimed is:

1. An information processing apparatus comprising:
a data format determination unit configured to determine whether data, which are read by near field wireless communications, correspond to data that are read in a peer-to-peer mode in the near field wireless communications;
a data attribute determination unit configured to identify an application that can use the data based on attribute information of the data, in a case where it is determined that the data correspond to the data that are read in the peer-to-peer mode by the data format determination unit;
a communication method determination unit configured to identify an application that can use the data based on a communication method used when the data are read, in a case where it is determined that the data do not correspond to the data that are read in the peer-to-peer mode by the data format determination unit; and
an application use processing unit configured to perform processing so that the application identified by the data attribute determination unit or the application identified by the communication method determination unit can use the data,
wherein
the communication method determination unit is configured to identify the application that can use the data from a plurality of applications and determine priority of execution of the application from among the plurality of applications based on a predetermined priority order related to use of the applications; and
in a case where no predetermined priority order related to use of the applications is provided, the application use processing unit sends a notification to two or more applications from among the plurality of applications that can handle the communication method of the read data that the read data is available, and allows the two or more applications to sequentially acquire the read data.

2. The information processing apparatus according to claim 1,
wherein the data attribute determination unit is configured to determine whether an application, which is displayed in foreground, can use the data.

3. The information processing apparatus according to claim 2, wherein the application use processing unit is configured to perform the processing in a manner so that, in a case where a plurality of applications are identified by the communication method determination unit, only one of the applications can use the data and the other applications cannot use the data.

4. The information processing apparatus according to claim 1, wherein the application use processing unit is configured to perform the processing in a manner so that, in a case where a plurality of applications are identified by the communication method determination unit, only one of the applications can use the data and the other applications cannot use the data.

5. The information processing apparatus according to claim 1, wherein
the application use processing unit allows the application that first responds to the notification that the read data is available to acquire the read data first, and excludes the other applications of the two or more applications from acquiring the read data.

6. The information processing apparatus according to claim 5, wherein
the application use processing unit excludes the other applications of the two or more applications from acquiring the read data in response to receiving a data lock request received from the application that first responds to the notification that the read data is available.

7. The information processing apparatus according to claim 6, wherein
the data lock request includes identification information of the application sending the data lock request.

8. An information processing method comprising:
determining whether data, which are read by near field wireless communications, correspond to data that are read in a peer-to-peer mode in the near field wireless communications;
identifying an application that can use the data based on attribute information of the data in a case where it is determined that the data correspond to the data that are read in the peer-to-peer mode;
identifying an application that can use the data based on a communication method used when the data are read in a case where it is determined that the data do not correspond to the data that are read in the peer-to-peer mode;
performing processing so that the application that is identified based on the attribute information of the data or the application identified based on the communication method used when the data are read can use the data;
identifying the application that can use the data from a plurality of applications; and
determining priority of execution of the application from among the plurality of applications based on a predetermined priority order related to use of the applications, wherein
in a case where no predetermined priority order related to use of the applications is provided, sending a notification to two or more applications from among the plurality of applications that can handle the communication method of the read data that the read data is available, and the two or more applications sequentially acquiring the read data.

9. A non-transitory computer-readable storage medium storing a computer-readable program causing a computer to execute an information processing method comprising:
determining whether data, which are read by near field wireless communications, correspond to data that are read in a peer-to-peer mode in the near field wireless communications;
identifying an application that can use the data based on attribute information of the data in a case where it is determined that the data correspond to the data that are read in the peer-to-peer mode;
identifying an application that can use the data based on a communication method used when the data are read in a case where it is determined that the data do not correspond to the data that are read in the peer-to-peer mode;
performing processing so that the application that is identified based on the attribute information of the data or the application identified based on the communication method used when the data are read can use the data; and
identifying the application that can use the data from a plurality of applications; and
determining priority of execution of the application from among the plurality of applications based on a predetermined priority order related to use of the applications, wherein
in a case where no predetermined priority order related to use of the applications is provided, sending a notification to two or more applications from among the plurality of applications that can handle the communication method of the read data that the read data is available, and the two or more applications sequentially acquiring the read data.

* * * * *